(12) United States Patent
Nishioka

(10) Patent No.: US 7,529,030 B2
(45) Date of Patent: May 5, 2009

(54) OPTICAL APPARATUS WITH OPTICAL ELEMENT MADE OF A MEDIUM EXHIBITING NEGATIVE REFRACTION

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 51 days.

(21) Appl. No.: 11/217,475

(22) Filed: Sep. 2, 2005

(65) Prior Publication Data

US 2006/0077566 A1 Apr. 13, 2006

(30) Foreign Application Priority Data

Sep. 6, 2004 (JP) ............... 2004-258718
Dec. 7, 2004 (JP) ............... 2004-354620

(51) Int. Cl.
*G02B 3/00* (2006.01)
*G02B 1/00* (2006.01)

(52) U.S. Cl. ............... 359/642; 359/708; 359/720

(58) Field of Classification Search .......... 359/642–830
See application file for complete search history.

(56) References Cited

U.S. PATENT DOCUMENTS

| | | | | |
|---|---|---|---|---|
| 3,679,286 A | * | 7/1972 | Klein | 359/677 |
| 4,458,991 A | * | 7/1984 | Yamada | 359/767 |
| 4,577,935 A | * | 3/1986 | Yamakawa et al. | 359/651 |
| 4,721,373 A | * | 1/1988 | Sugiyama | 359/796 |
| 4,784,478 A | * | 11/1988 | Takada | 359/654 |
| 4,786,151 A | * | 11/1988 | Hamada | 359/662 |
| 5,202,992 A | * | 4/1993 | Banno et al. | 359/676 |
| 5,448,408 A | * | 9/1995 | Togino et al. | 359/651 |
| 5,661,607 A | * | 8/1997 | Katsuma | 359/719 |
| 5,712,735 A | * | 1/1998 | Hashimoto et al. | 359/727 |
| 6,052,540 A | * | 4/2000 | Koyama | 396/296 |
| 6,788,273 B1 | * | 9/2004 | Schultz et al. | 343/909 |
| 6,833,966 B2 | * | 12/2004 | Nishioka et al. | 359/726 |
| 6,891,596 B2 | * | 5/2005 | Rostalski et al. | 355/53 |
| 2002/0175693 A1 | | 11/2002 | Starr et al. | |
| 2003/0227415 A1 | * | 12/2003 | Joannopoulos et al. | 343/754 |
| 2005/0007567 A1 | | 1/2005 | Pierrat et al. | |
| 2005/0145964 A1 | * | 7/2005 | Suzuki et al. | 257/432 |
| 2006/0006485 A1 | * | 1/2006 | Mouli | 257/432 |

FOREIGN PATENT DOCUMENTS

| | | |
|---|---|---|
| JP | 2003-050325 | 2/2003 |
| JP | 2003-195002 | 7/2003 |
| JP | 2004-133040 | 4/2004 |

OTHER PUBLICATIONS

Pendry, "Negative refraction makes a perfect lens," Phys. Review Letts., vol. 85, No. 18, pp. 3966-3969, 2000.

Veselago, "The electrokynamics of substances with simultaneously negative values of $\epsilon$ and $\mu$," Soviet Phys. USPEKHI, vol. 10, No. 4, pp. 509-514, 1968.

(Continued)

*Primary Examiner*—Darryl J Collins
(74) *Attorney, Agent, or Firm*—Kenyon & Kenyon LLP

(57) ABSTRACT

A lens made of a medium exhibiting negative refraction is disclosed. Also, an optical element made of a medium exhibiting negative refraction is disclosed. The lens or optical element may be incorporated in an optical system or an optical apparatus.

67 Claims, 6 Drawing Sheets

OTHER PUBLICATIONS

Liu et al., "Near-field optical storage system using a solid immersion lens with a left-handed material slab," Optics Express, vol. 12, No. 20, pp. 4835-4840, 2004.

Notomi, "Negative refractive ptics in photonic crystals," Proceedings of SPIE, vol. 4283, pp. 428-441, 2001.

Notomi, "Theory of light propagation in strongly modulated photonic crystals: refractionlike behavior in the vicinity of the photonic band gap," Physical Review B, vol. 62, No. 16, pp. 10696-10705, 2000.

Structure and application of optical system, pp. 73-77, pp. 166-170, Optronics Co., Ltd., Nov. 19, 2003.

Sato and Kawakami, Optronics July Issue, pp. 197, Optronics Co., Ltd., 2001.

Sergentu et al., "Focusing effect of photonic crystal concave lens made from porous dielectrics", Phys. Sat. Sol. 201(5): R31-R33, 2004.

International Search Report, International Application No. PCT/JP2005/016338 filed Sep. 9, 2005.

Negative Refraction Makes a Perfect Lens, J.B. Pendry, vol. 85, No. 18 Physical Review Letters Oct. 30, 2000.

Rapid Research Note, Focusing effect of photonic crystal concave lenses made from porous dielectrics, V.V. Sergentu, E. Foca, S. Langa, J. Carstensen, H. Foll, and I.M. Tiginyanu, phys. stat. sol. (a) 201. No. 5, R31-R33 (2004)/ DOI 10.1002/pssa.200409035.

Pendry and Smith, "Reversing Light: Negative Refraction", Physics Today, Dec. 2003: pp. 1-8, American Institute of Physics.

Schurig and Smith, "Negative index lens aberrations", Physical Review E 70, 065601(R), Dec. 2004: pp. 065601-1 to 065601-4, The American Physical Society.

* cited by examiner

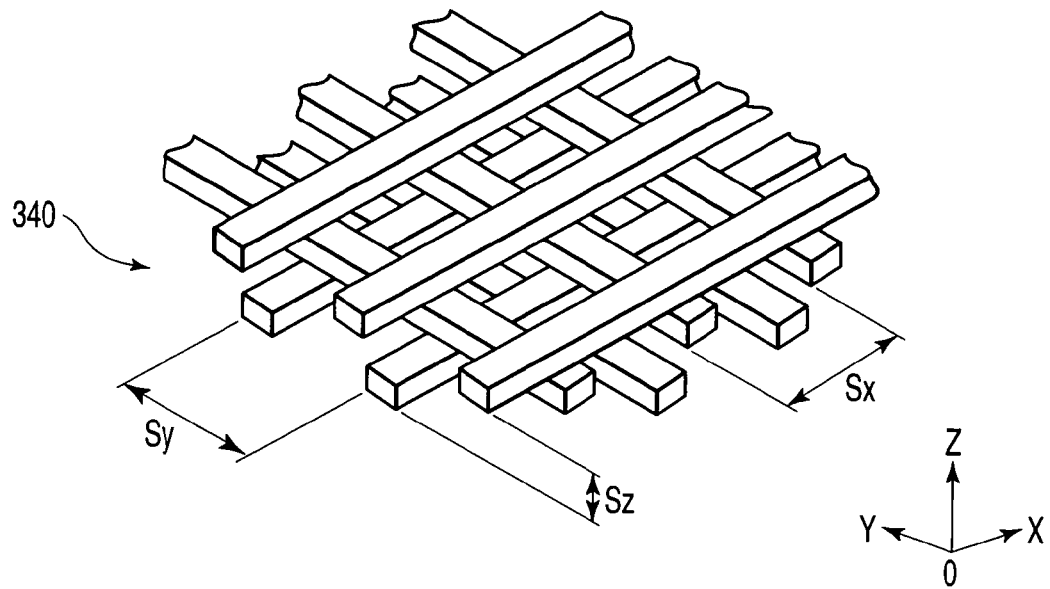
F I G. 9
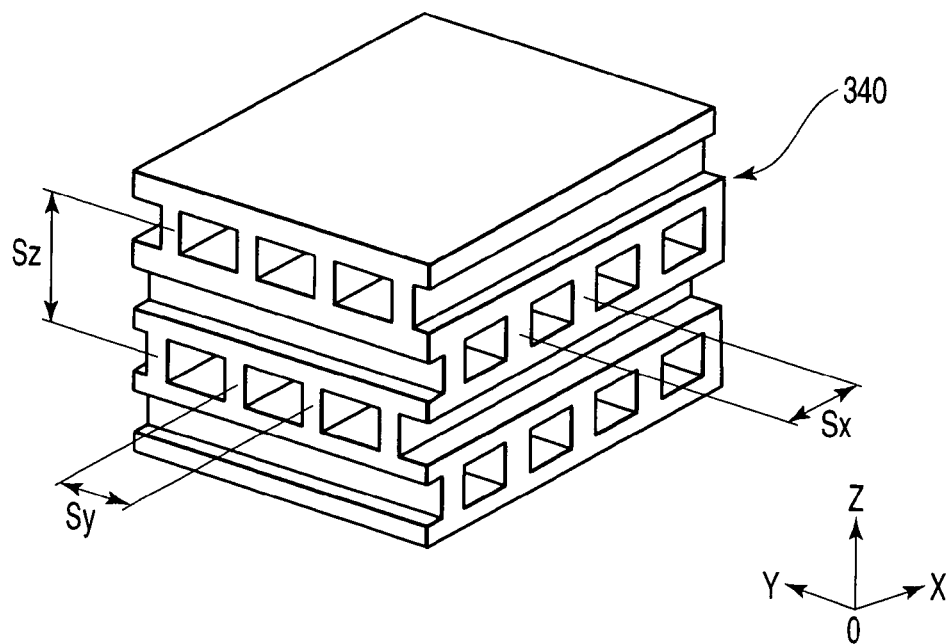
F I G. 10

OPTICAL APPARATUS WITH OPTICAL ELEMENT MADE OF A MEDIUM EXHIBITING NEGATIVE REFRACTION

CROSS-REFERENCE TO RELATED APPLICATIONS

This application is based upon and claims the benefit of priority from prior Japanese Patent Applications No. 2004-258718, filed Sep. 6, 2004; and No. 2004-354620, filed Dec. 7, 2004, the entire contents of both of which are incorporated herein by reference.

BACKGROUND OF THE INVENTION

1. Field of the Invention

The present invention relates to an optical apparatus using an optical system such as an optical element, a microscope, a lithographic optical system, or an optical system of an optical disk.

2. Description of the Related Art

Conventionally, in the above optical system, a water-immersion method, oil-immersion method, or solid immersion method has been used to increase an object-side numerical aperture in order to increase resolution (see non-patent document 1 listed below). Further, there are documents as listed below about materials (e.g., photonic crystal) possessing refractive characteristics different from those of a general glass lens and the like (non-patent documents 2 and 3, patent document 1, 2, 3, 4, and 5).

Non-Patent Document 1:
Structure and Application of Optical System P73-77, P166-170, Optronics Co., Ltd., Published on Nov. 19, 2003

Non-Patent Document 2:
J. B. Pendry Phys. Rev. Lett., Vol. 85, 18 (2000) 3966-3969

Non-Patent Document 3:
M. Notomi. Phy. Rev. B. Vol. 62 (2000) 10696

Non-Patent Document 4:
V. G. Veselago Sov. Phys. Usp. Vol. 10, 509-514(1968)

Non-Patent Document 5:
L. Liu and S. He Optics Express Vol. 12 No. 20 4835-4840 (2004)

Non-Patent Document 6:
Sato and Kawakami, Optronics, July issue 2001, P197, published by Optronics Co., Ltd.

Patent Document 1:
U.S. 2003/0227415 A1

Patent Document 2:
U.S. 2002/0175693 A1

Patent Document 3:
Japanese Unexamined Published Patent Application No. 2003-195002

Patent Document 4:
Japanese Unexamined Published Patent Application No. 2004-133040

Patent Document 5:
U.S. 2005/0007567 A1

BRIEF SUMMARY OF THE INVENTION

According to a first aspect of the present invention, there is provided a lens made of a medium exhibiting negative refraction. Preferably, one side of the lens may have a plane surface. Alternatively, the lens may have an aspherical surface, a rotationally asymmetrical surface, or an extended curved surface.

According to a second aspect of the present invention, there is provided a lens or an optical element, including an optical element made of a material exhibiting a positive refractive index, and a medium exhibiting negative refraction formed on the optical element serving as a substrate.

According to a third aspect of the present invention, there is provided an optical element including a transparent flat plate, and a medium exhibiting negative refraction formed on the flat plate serving as a substrate.

According to a fourth aspect of the present invention, there is provided an optical system having an optical element made of a medium exhibiting negative refraction.

According to a fifth aspect of the present invention, there is provided an optical system having an optical element made of a medium exhibiting negative refraction, and an optical element other than the optical element made of a medium exhibiting negative refraction.

According to a sixth aspect of the present invention, there is provided an optical system having an optical element made of a medium exhibiting negative refraction, and an optical element made of a medium exhibiting a positive refractive index, wherein there existed a gap between the optical element made of a medium exhibiting a positive refractive index, which is nearest to the optical element made of a medium exhibiting a negative refraction, and the optical element made of a medium exhibiting a negative refraction.

According to a seventh aspect of the present invention, there is provided an image forming optical system including an optical element made of a medium exhibiting negative refraction.

According to an eighth aspect of the present invention, there is provided an optical system constituted by a combination of an optical element made of a medium exhibiting negative refraction and an image forming optical system.

According to a ninth aspect of the present invention, there is provided an optical system having an image formation relationship achieved by an optical element made of a medium exhibiting negative refraction, and having an optical element, other than the optical element made of a medium exhibiting negative refraction.

According to a tenth aspect of the present invention, there is provided an optical system including an image formation relationship achieved by an optical element made of a medium exhibiting negative refraction, and an image formation relationship achieved by an image forming optical system.

According to an eleventh aspect of the present invention, there is provided an optical system including an optical system including an optical element made by a medium exhibiting negative refraction, and an image forming optical system, wherein the optical system is used for forming an image and the image forming optical system is used for re-forming the image.

According to a twelfth aspect of the present invention, there is provided an optical system including an optical system including an optical element made by a medium exhibiting negative refraction, and an image forming optical system, wherein the image forming optical system is used for forming an image and the optical system is used for re-forming the image.

According to a thirteenth aspect of the present invention, there is provided an optical system, wherein an image forming optical system is disposed at the rear of an optical element made of a medium exhibiting negative refraction.

According to a fourteenth aspect of the present invention, there is provided an optical system, wherein an image forming optical system is disposed at the front of an optical element made of a medium exhibiting negative refraction.

According to a fifteenth aspect of the present invention, there is provided an optical apparatus provided with an optical system having an optical element made of a medium exhibiting negative refraction.

According to a sixteenth aspect of the present invention, there is provided an optical apparatus having a light source, a member with a microscopic structure, and an optical element made of a medium exhibiting negative refraction and performing image formation of the microscopic structure.

According to a seventeenth aspect of the present invention, there is provided an exposure apparatus having a light source, a photomask, and an optical element made of a medium exhibiting negative refraction, which are disposed in sequence, and performing an exposure process with respect to a wafer.

According to an eighteenth aspect of the present invention, there is provided a lens having a curved optical surface wherein a photonic crystal is used as the medium exhibiting negative refraction.

According to a nineteenth aspect of the present invention, there is provided an optical apparatus provided with an optical system having an optical element made of a medium exhibiting negative refraction and an image forming optical system, wherein the absolute value of the distance between the intermediate image forming point of the image forming optical system and the surface of the optical element made of a medium exhibiting negative refraction is 0.1 $\lambda/A$ or more, where A is a numerical aperture of the image forming optical system at the intermediate image forming point.

According to a twentieth aspect of the present invention, there is provided an optical apparatus provided with an optical system having an optical element made of a medium exhibiting negative refraction and an image forming optical system, wherein the absolute value of the distance between the optical surface of the image forming optical system nearest to the optical element made of a medium exhibiting negative refraction and the intermediate image forming point of the image forming optical system is 0.1 $\lambda/A$ or more, where A is a numerical aperture of the image forming optical system at the intermediate image forming point.

According to a twentieth-first aspect of the present invention, there is provided an optical apparatus having a light source, a member with a microscopic structure, and an optical element made of a medium exhibiting negative refraction, wherein the distance between the member with a microscopic structure and the surface of the optical element made of a medium exhibiting negative refraction is 0.1 $\lambda$ or more.

According to a twentieth-second aspect of the present invention, there is provided an optical apparatus having an optical element made of a medium exhibiting negative refraction and an image forming optical system, wherein the thickness $t$ of the optical element made of a medium exhibiting negative refraction satisfies any one of the following formulas (17) to (20).

$$0.1 \text{ mm} \leq t \leq 300 \text{ mm} \quad \text{formula (17)}$$

$$0.01 \text{ mm} \leq t \leq 300 \text{ mm} \quad \text{formula (18)}$$

$$1100 \text{ nm} \leq t \leq 200 \text{ mm} \quad \text{formula (19)}$$

$$100 \text{ nm} \leq t \leq 50 \text{ mm} \quad \text{formula (20)}$$

According to a twentieth-third aspect of the present invention, there is provided an optical apparatus having a light source, a member with a microscopic structure, and an optical element made of a medium exhibiting negative refraction, wherein the thickness $t$ of the optical element made of a medium exhibiting negative refraction satisfies any one of the following formulas (17) to (20).

$$0.1 \text{ mm} \leq t \leq 300 \text{ mm} \quad \text{formula (17)}$$

$$0.01 \text{ mm} \leq t \leq 300 \text{ mm} \quad \text{formula (18)}$$

$$1100 \text{ nm} \leq t \leq 200 \text{ mm} \quad \text{formula (19)}$$

$$100 \text{ nm} \leq t \leq 50 \text{ mm} \quad \text{formula (20)}$$

According to a twenty-fourth aspect of the present invention, there is provided an optical apparatus provided with an optical system having an optical element made of a medium exhibiting negative refraction, wherein a photonic crystal is used as the medium exhibiting negative refraction and the axis whose direction exhibits best rotationally symmetrical characteristics of the photonic crystal extends in parallel to the optical axis of the optical system.

According to a twenty-fifth aspect of the present invention, there is provided an optical apparatus provided with an optical element made of a medium exhibiting negative refraction, wherein the length of the optical system measured along the optical axis thereof is 20 m or less.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a view showing an example of a photonic crystal 340;

FIG. 10 is a view showing an example of a photonic crystal 340; and

DETAILED DESCRIPTION OF THE INVENTION

Figure 1:
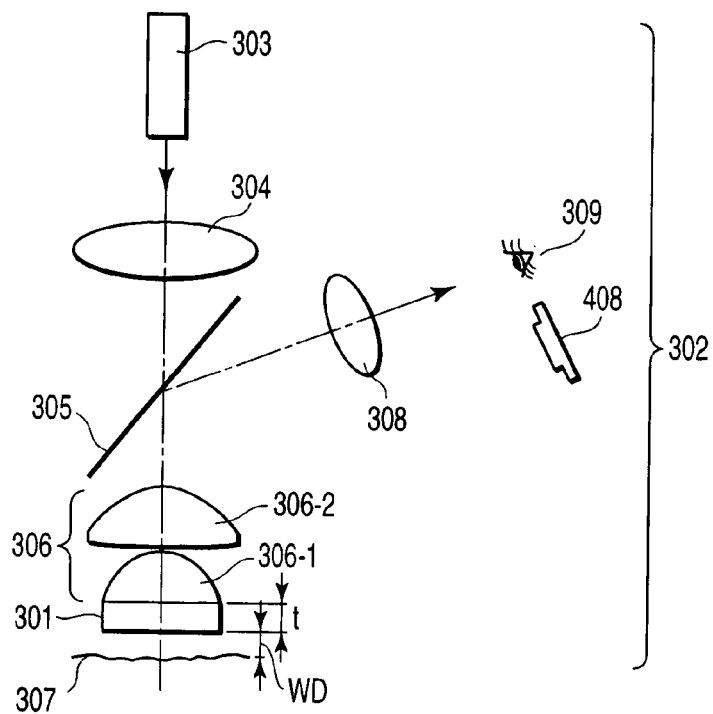
FIG. 1 is an embodiment of the present invention, showing an example of a reflected-light microscope 302 using a negative index medium 301.

Embodiments of the present invention will be described below in detail with reference to the accompanying drawings. FIG. 1 is an embodiment of the present invention, showing an example of a reflected-light microscope 302 using a negative index medium 301, the components of which are surrounded by air. Light emitted from a light source 303 (e.g., a laser light source, a mercury lamp, or the like) is passed through an illumination lens 304, a semitransparent mirror 305 and enters an objective lens 306. The numerical aperture (NA) of the objective lens 306 exceeds, e.g., 1 and therefore it is possible to excite evanescent wave. The objective lens 306 includes an optical element made of a medium having a positive refractive index. For example, the objective lens includes lenses 306-1, 306-2 each made of glass.

Figure 2:
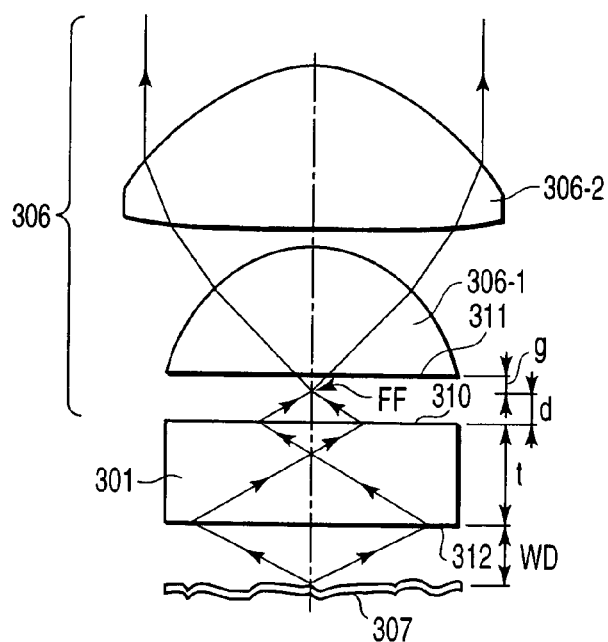
FIG. 2 is an enlarged view of a part in the vicinity of an objective lens 306 of FIG. 1.

FIG. 2 is an enlarged view of a part in the vicinity of the objective lens 306 of FIG. 1. Here, a surface 311 is set as the object side surface of the objective lens 306. Further, in FIG. 2, an intermediate image forming point of the objective lens 306 is represented by FF, and the distance between the surface 311 and intermediate image forming point FF is represented by g.

For example, a plane parallel plate made of negative index medium 301 is disposed at the location apart from the intermediate image forming point FF by a distance d, where d represents the distance between the intermediate image forming point FF and an upper surface 310 of the negative index medium. The value of d is set to, e.g., 50 μm. Reference numeral 312 represents an object side surface of the negative index medium 301.

The light scattered by the object 307 is passed through the negative index medium 301, objective lens 306, reflected by the semitransparent mirror 305, and passed through an eye lens 308 and can then be observed by an eye 309, TV camera provided with an image pickup device 408, or cooling CCD camera. This mechanism will be described below in detail.

Assume here that the refractive index of the negative index medium 301 is −1 and the thickness thereof is t (e.g., 300 μm). WD (working distance), which will later be described in detail, is the distance between the negative index medium 301 and object 307 or an imaging member to be described later.

Since the refractive index of the negative index medium 301 is −1, the light scattered by the object 307 is refracted, in a manner different from usual, as shown by the arrows in FIG. 2 (see non-patent document 2).

From the law of refraction, assuming that angle of incidence is i and angle of refraction is r, the following condition is satisfied:

$r=-i$      formula (0-3)

Assuming that the refractive index of the negative index medium 301 is n, the following condition is satisfied:

$\sin r = (1/n)\sin i$      formula (0-4)

According to non-patent document 2, the following condition is satisfied:

$t=WD+d$      formula (1)

In this case, the negative index medium 301 allows the image of the object 307 to be perfectly imaged onto the intermediate image forming point FF. That is, perfect image formation is achieved. "Perfect image formation" indicates a state where all the light as an electromagnetic field, including radiation light and evanescent wave, which is not influenced by the diffraction limit is imaged. This state corresponds to a state where the object is situated at the point FF.

The value of g, which is a distance from the point FF to the surface 311, is represented by the following condition:

$0 \leq g \leq \lambda$      formula (0)

Thus, the intermediate image forming point FF is in close proximity to the surface 311. This is a desirable condition for the effective use of the evanescent wave.

On the practical side, it may be sufficient, in some cases, to satisfy the following condition:

$0 \leq g \leq 10\lambda$      formula (0-1)

where λ is a wavelength of the light to be used, and in the case where the light to be used is visible light, the value of λ falls within a range of 0.35 to 0.7 μm.

In this manner, image formation including the evanescent wave in the case where NA>1.0 is enabled to realize a high-resolution microscope.

Depending on the use, it is possible to use the value of g represented by the following condition:

$0 \leq g \leq 1000\lambda$      formula (0-1-0)

It is preferable that the lower limit of g be set to 0.1 λ/A in the formulas (0) to (0-1-0). In this case, dust, scratches, or the like on the lens surface 311 become out of focus to thereby reduce an adverse effect. Note that A is the NA in the FF of the objective lens 306.

It is preferable that the lower limit of g is set to 0.6 λ/A in the formulas (0) to (0-1-0). In this case, the adverse effect of dust, scratches, or the like is further reduced.

When the lower limit of g is set to 1.3 λ/A in the formulas (0) to (0-1-0), the adverse effect of dust, scratches, or the like is significantly reduced.

Assuming that d is set to 50 μm, WD becomes 250 μm from the formula (1). The great length of WD is a merit that has not conventionally been seen. Assume that the value of g can be reduced to, e.g., a range of zero to several ten's of nm. The image forming capability in this case substantially corresponds to that of a solid immersion lens system in which the objective lens 306 is almost in contact with the object 307.

The embodiment of the present invention is featured in that the optical element (301 etc.) made of the negative index medium and image forming optical system (306 etc.) are combined. In the present embodiment, the image forming optical system is disposed on the image side of the negative index medium 301.

Further, the embodiment of the present invention is characterized in that the object image (intermediate image) formed by the negative index medium 301 is re-formed by the objective lens 306. In the example of FIG. 2, the intermediate image is a real image. Alternatively, however, the intermediate image can be a virtual image depending on the use of the optical system. Further, the example of FIG. 2 is characterized in that illuminating light and observation light transmit through the negative index medium 301 twice in total in directions opposite to each other.

Although the case where g≥0 has been described in the above, the following case can be applied:

$g<0$      formula (0-5)

because, assuming that $$d+g>0 \quad \text{formula (0-6)}$$

is satisfied, it is possible to prevent the optical elements from being in contact with each other and thereby maintain the image formation relationship. g<0 indicates that the FF is positioned within the lens (e.g., lens 306-1). However, when the value of g becomes too small, the condition of perfect image formation breaks.

Thus, it is preferable that the following condition be satisfied:

$$-t<g<0 \quad \text{formula (0-7)}$$

Further, depending on the use of the optical system, it is sufficient to satisfy the following condition:

$$-3t<g<0 \quad \text{formula (0-8)}$$

Further, it may be sufficient, in some cases, to satisfy the following condition, depending on the type of the optical system:

$$-10t<g<0 \quad \text{formula (0-9)}$$

Incidentally, d+g=0 is also permissible.

When a real value is used to represent g, it is preferable that the following condition be satisfied:

$$-100 \text{ mm}<g<0 \quad \text{formula (0-10)}$$

When the value of g falls below the lower limit of the formula (0-10), it becomes difficult to manufacture lenses. It is more preferable to satisfy the following condition:

$$-10 \text{ mm}<g<0 \quad \text{formula (0-11)}$$

It is preferable that the upper limit of g be set to $(-0.1\lambda)/A$ in the formulas (0-5) to (0-11). In this case, it is possible to reliably utilize the evanescent wave. At the same time, dust, scratches, or the like on the lens surface 311 become out of focus to thereby reduce an adverse effect. It is preferable that the upper limit of g be set to $(-0.6\lambda)/A$ in the formulas (0-5) to (0-11). In this case, adverse affect of the dust, scratch, or the like is further reduced.

It is preferable that the upper limit of g be set to $(-1.3\lambda)/A$ in the formulas (0-5) to (0-11). In this case, the adverse effect of the dust, scratches, or the like is significantly reduced.

It is not necessary to strictly follow the formula (1). This is because that the image position determined by the negative index medium 301 may be shifted from the value obtained in the formula (1) in some cases due to manufacturing error in the refractive index of the negative index medium 301 or error in the surface accuracy. That is, it is sufficient to satisfy the following condition:

$$0.8(WD+d) \leq t \leq 1.2(WD+d) \quad \text{formula (2)}$$

Further, it may be sufficient, in some cases, to satisfy the following condition, depending on the product type:

$$0.5(WD+d) \leq t \leq 1.5(WD+d) \quad \text{formula (3)}$$

Moreover, it may be sufficient, in some cases, to satisfy the following condition, depending on the use condition of the product:

$$0.15(WD+d) \leq t \leq 4.0(WD+d) \quad \text{formula (4)}$$

If the following formula (4-1) be satisfied, it is possible to ensure the great length of WD.

$$t \leq 0.9(WD+d) \quad \text{formula (4-1)}$$

The concept described above can also be applied to another embodiment of the present invention. Also in another embodiment, the refractive index of the negative index medium 301 is set to, e.g., −1.

Figure 3:
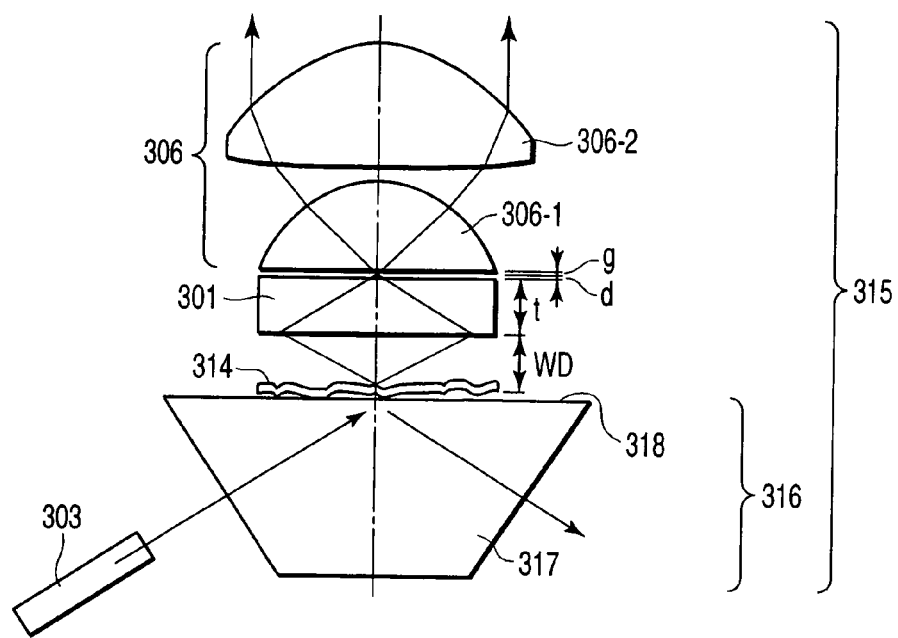
FIG. 3 is another embodiment of the present invention, showing a transmitted-light microscope 315 using the negative index medium 301.

FIG. 3 is another embodiment of the present invention, showing a transmission microscope 315 using the negative index medium 301. Only a part in the vicinity of an illuminating optical system 316 and objective lens 306 is shown in an enlarged manner in FIG. 3. The components of the transmission microscope 315 are surrounded by air.

Light emitted from the light source 303 enters a prism 317 and reaches a surface 318 of the prism 317 on the side of a sample 314 at an angle of total reflection. The sample 314 is accordingly illuminated by the evanescent wave. The light scattered by the sample 314 is refracted by the negative index medium 301 and perfectly imaged onto the vicinity of the intermediate image forming point FF. After that, the light is refocused by the objective lens 306 and is subjected to observation.

The above formulas (0), (0-1), (0-1-0), (0-3), (0-11), (1), (2), (3), (4), and (4-1) are also applicable to this embodiment.

Figure 4:
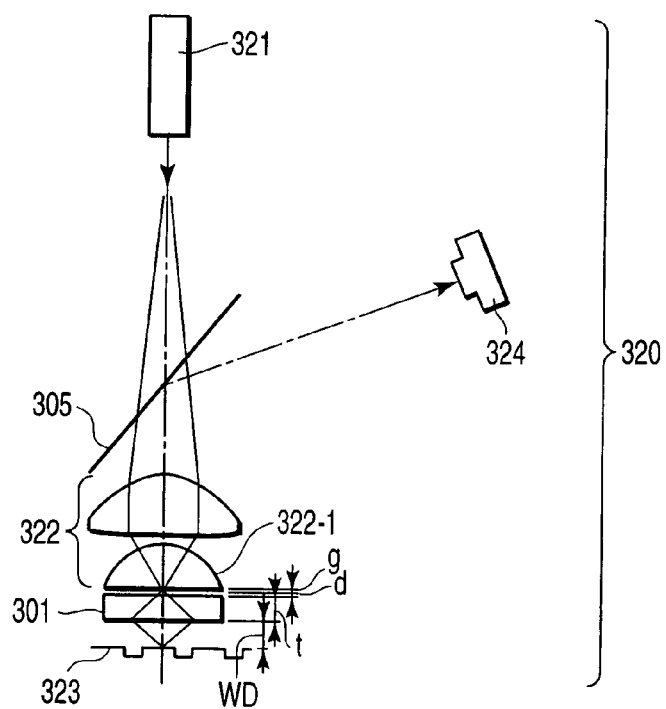
FIG. 4 is a view showing an embodiment of an optical system 320 of an optical disk.
Figure 5:
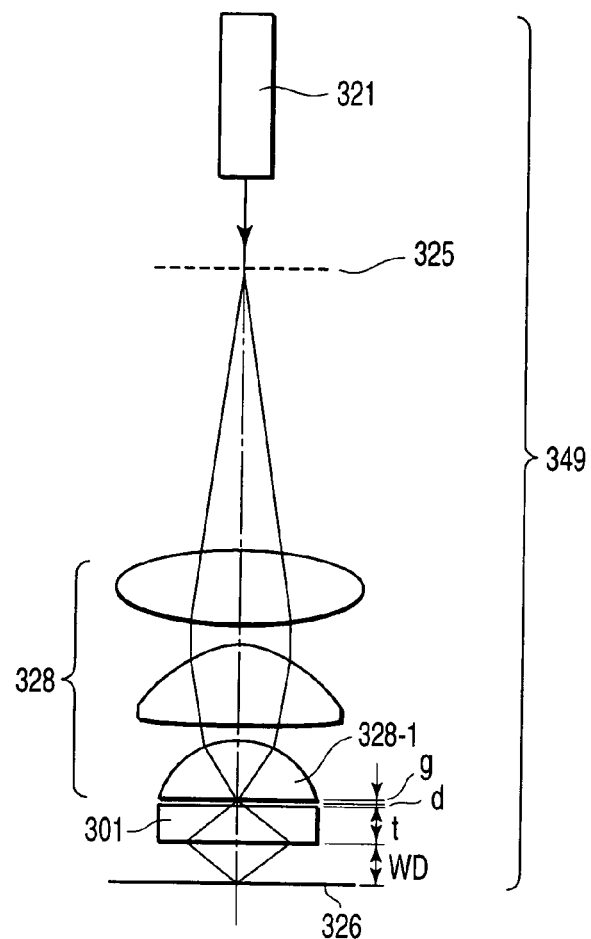
FIG. 5 is an embodiment of an optical system of a projection exposure apparatus.

In FIG. 3, and FIGS. 4 and 5 to be described later, the value of d is sufficiently smaller than that of WD and the value of g is near 0. The optical system shown in FIGS. 1 and 3 is applicable to a scanning-type microscope.

FIG. 4 is an embodiment of an optical system 320 of an optical disk. Light emitted from a semiconductor laser serving as a light source 321 is passed through the semitransparent mirror 305, objective lens 322, and negative index medium 301 and imaged onto an optical disk 323 and thereby writing process is performed. The NA of the objective lens 322 exceeds 1 and therefore high-density writing can be performed by a microscopic spotlight including the evanescent light without contacting the objective lens 322 with the optical disk. The optical system 320 is surrounded by air.

The image formation in the negative index medium 301 is performed by the light traveling in the reverse direction to that shown in FIG. 2. In the case of a signal reading from the optical disk 323, the light emitted from the light source 321 is scattered by the optical disk 323, passed through the negative index medium 301, objective lens 322, and reflected by the semitransparent mirror 305, and enters a photodetector 324. It is possible to perform a reading process with a high-NA lens in a non-contact manner.

As a configuration at the time of writing, a photomask 325 is disposed between the light source 321 and objective lens 322, a silicon wafer 326 is disposed in place of the optical disk 323 as shown in FIG. 5, and the photomask 325 and silicon wafer 326 are optically conjugated. With the above configuration, a projection exposure apparatus 349 (stepper, etc.) for LSI manufacturing can be obtained. Since the NA exceeds 1 and therefore the evanescent wave can be utilized, high resolution can be obtained. Further, it is convenient that a non-contact exposure can be performed. In FIG. 5, the optical system of the projection exposure apparatus is disposed in vacuum.

The above formulas (0), (0-1), (0-1-0), (0-3), . . . (0-11), (1), (2), (3), (4), and (4-1) are also applicable to the embodiments shown in FIGS. 4 and 5.

In the examples shown in FIGS. 1 to 5, the negative index medium 301 and the lens nearest to the negative index medium 301 are spaced apart from each other.

With this configuration, when the negative index medium 301 is damaged due to, for example, collision with the object, the entire function can be restored simply by replacing the negative index medium 301. That is, repair can be easily completed.

Figure 6:
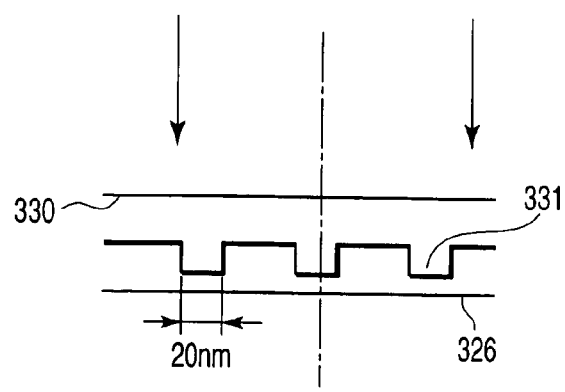
FIG. 6 is a view showing a contact-mode lithography system that has conventionally been proposed.

FIG. 6 is a view showing a contact-mode lithography system that has conventionally been proposed. When an illuminating light is irradiated on a transparent polymer photomask 330 having a line width of 20 nm from above, the evanescent wave is generated below a projection portion 331 to expose a photoresist on the silicon wafer 326. After that, LSI manufacturing is started. The polymer photomask 330 is a member having a microscopic structure. However, the polymer photomask 330 and silicon wafer 326 need to be in intimate contact with each other. As a result, a problem that the life of the polymer photomask 330 is short, or the polymer photomask 330 is easily damaged occurs at the time of practical use. This problem has occurred even in the case where a chrome photomask is used in place of the polymer photomask.

According to the present invention that has been made in view of the above point, it is possible to realize a high-resolution lithography in a non-contact manner by using the negative index medium 301.

Figure 7:
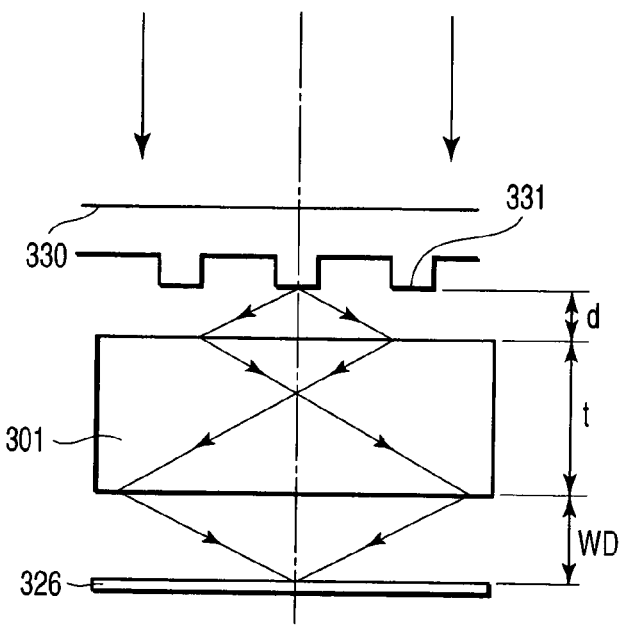
FIG. 7 is a view showing a state where a flat plate made of the negative index medium 301 is disposed in close contact with or close proximity to a polymer photomask 330 between a silicon wafer 326 and the polymer photomask 330.

FIG. 7 is a view for explaining this. As shown in FIG. 7, a plane parallel plate of the negative index medium 301 is disposed between the silicon wafer 326 and polymer photomask 330 in such a manner to be in intimate contact with or close proximity to the polymer photomask 330. The optical system of FIG. 7 is surrounded by a vacuum or air.

With the above configuration, the evanescent wave generated below the projection portion 331 of the polymer photomask 330 is perfectly imaged onto the silicon wafer 326 by the negative index medium 301 and an image of the photomask 330 is formed on the silicon wafer 326. The imaging magnification is 1. In this manner, it is possible to realize high-resolution lithography with a large WD.

Assuming that the distance between the projection portion 331 and negative index medium 301 is d, the above formulas (1) to (3), (4), and (4-1) are satisfied.

While it is preferable that the NA of the object side of the objective lens 306, optical disk side of the objective lens 322, and silicon wafer 326 side of the projection lens 328 be 1.0 or more, a value of less than 1.0 is also permissible. For example, NA of 0.2 or more, or less can be used. The reason is that WD can be extended by the negative index medium 301.

It is preferable that the NA of lens 306, 322, 328 and the like be set to 1.15 or more. In this case, it is possible to realize high resolution.

It is further preferable that the NA of the above optical components be set to 1.3 or more. In this case, it is possible to realize high resolution equal to or higher than that obtained in the case where a water immersion objective lens is used.

It is further preferable that the NA of the above optical components be set to 1.5 or more. In this case, it is possible to realize high resolution equal to that obtained in the case where an oil immersion objective lens is used.

The shape of the negative index medium 301 is not limited to a plane parallel plate in the embodiments of FIGS. 1, 2, 3, 4, and 5.

Figure 8:
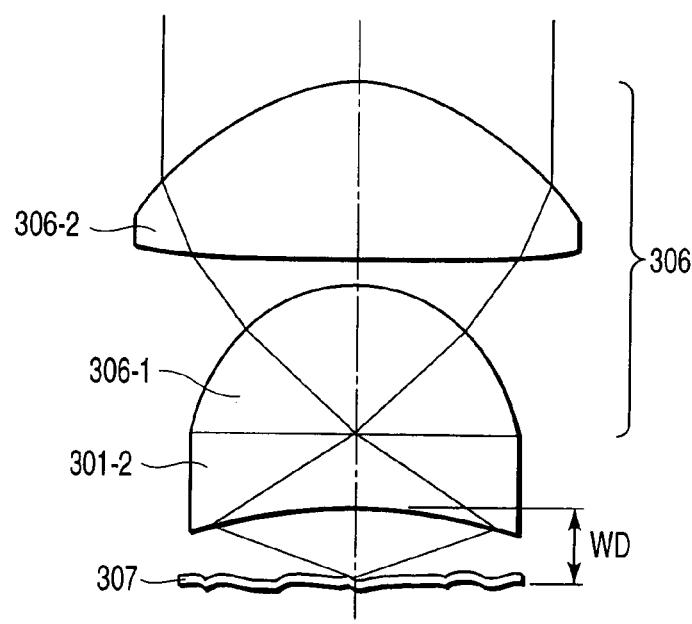
FIG. 8 is a view of an embodiment showing a lens 301-2 made of a negative index medium.

As shown in FIG. 8, it is possible to use a lens 301-2 made of a negative index medium and having a concave surface at the object side as a negative index medium. In this case, it is possible to obtain an aberration correction effect as well as to obtain the effect of extending WD. In FIG. 8, the lens 301-2 made of a negative index medium has a one plane and one concave surface. Alternatively, however, the lens 301-2 may be a biconvex lens, a plane-convex lens, a biconcave lens, a convex meniscus lens, or a concave meniscus lens.

The curved surface of the lens 301-2 made of a negative index medium may be a spherical or aspherical surface, free-formed surface, rotationally asymmetrical surface, or expanded surface.

Features common to the present invention will be described below. As a material of the negative index medium 301, a photonic crystal can be used. FIG. 9 shows a first example of a photonic crystal 340, and FIG. 10 shows a second example of the photonic crystal 340. As shown in FIGS. 9 and 10, the photonic crystal 340 is a material having a periodical structure on the scale of $\lambda$ to a several tenth of $\lambda$ and fabricated with lithography or the like. The material used is a dielectric material including SiO2, synthetic resin such as acrylic, polycarbonate, and the like, or GaAs, etc. $\lambda$ is a wavelength of the light to be used. Each of the period Sx, Sy, and Sz repeated in X, Y, and Z-directions in the drawing has a scale of $\lambda$ to a several tenth of $\lambda$. It has been known that it is possible to realize a negative refractive index at a portion in the vicinity of the band edge of the photonic crystal (see non-patent document 3). It is preferable that the Z-direction in the drawing be set to the optical axis of the optical system. The Z-axis is the direction that exhibits best rotationally symmetrical characteristics of the photonic crystal.

It is desirable that Sx, Sy, and Sz satisfy the following conditions, respectively:

$\lambda/10 < Sx < \lambda$          formula (5-1)

$\lambda/10 < Sy < \lambda$          formula (5-2)

$\lambda/10 < Sz < \lambda$          formula (5-3)

When the values of Sx, Sy, and Sz exceed the upper limits, or fall below the lower limits, the photonic crystal is prevented from functioning properly.

Depending on the use, it is sufficient for Sx, Sy, and Sz to satisfy the following conditions, respectively:

$\lambda/30 < Sx < 4\lambda$          formula (5-4)

$\lambda/30 < Sy < 4\lambda$          formula (5-5)

$\lambda/30 < Sz < 4\lambda$          formula (5-6)

It has been known that when the relative permittivity $\epsilon$ of the negative index medium is negative and relative permeability $\mu$ thereof is negative, the refractive index of the medium to a vacuum becomes $-\sqrt{\epsilon\mu}$.

As the negative index medium, it is possible to use a material exhibiting negative refraction or a material approximately exhibiting negative refraction, such as a thin film made of silver, gold, or copper, or a material exhibiting negative refraction in a specific polarizing direction, or a thin film made of a material having a relative permittivity $\epsilon$ of about $-1$.

In some cases, the negative index medium is referred to as "left-handed material". In the present invention, negative index medium, left handed material, material approximately exhibiting negative refraction, material exhibiting negative refraction in a specific polarizing direction, and a thin film made of material having a relative permittivity $\epsilon$ of about $-1$ are all referred to as medium exhibiting negative refraction. A material exhibiting perfect image formation properties is also included in the medium exhibiting negative refraction. It is preferable to satisfy the following condition in the case of a thin film made of the material having a relative permittivity $\epsilon$ of about $-1$:

$-1.2 < \epsilon < -0.8$          formula (5-7)

Depending on the use, it is sufficient to satisfy the following condition:

$-1.6 < \epsilon < -0.5$          formula (5-8)

As a wavelength of the light to be used, monochromatic light is used in the above embodiments. Alternatively, however, it is possible to use a low-coherence light source such as a light source emitting a continuous spectrum, a white light source, sum of monochromatic lights, or a superluminescent diode.

In view of transmission performance in air and availability of a light source, it is preferable to use a wavelength of 0.1 μm to 3 μm. It is preferable to use a visible light in view of ease of use. Further, it is further preferable that a wavelength of not more than 0.6 μm be used. In this case, resolution is increased.

A detailed description will be given below of the WD.

It is preferable that the value of WD satisfy the following condition:

$$100 \text{ nm} \leq WD \leq 20 \text{ mm} \quad \text{formula (7)}$$

When the value of WD falls below the lower limit of the formula (7), working distance is reduced too much and the ease of use is lost. On the other hand, when the value of WD exceeds the upper limit of the formula (7), the size of the negative index medium is increased too much, resulting in disadvantage with regard to cost and manufacturing efficiency. Further, the size of the entire optical apparatus is increased too much.

Depending on the product type, the value of WD satisfying the following condition is permissive:

$$20 \text{ nm} \leq WD \leq 200 \text{ mm} \quad \text{formula (8)}$$

When the WD is set to a value satisfying the following condition, it is possible to obtain an optical apparatus further excellent in ease of use:

$$1100 \text{ nm} \leq WD \leq 200 \text{ mm} \quad \text{formula (8-0-1)}$$

It is preferable to satisfy the following condition:

$$0.01 \text{ mm} \leq WD \leq 200 \text{ mm} \quad \text{formula (8-0-2)}$$

In this case, it is possible to obtain an optical apparatus further excellent in ease of use as well as to simplify the mechanism for determining the WD of the optical apparatus.

Further, it is preferable to satisfy the following condition:

$$0.1 \text{ mm} \leq WD \leq 200 \text{ mm} \quad \text{formula (8-0-3)}$$

In this case, it is possible to obtain an optical apparatus further excellent in ease of use as well as to reduce the required mechanical accuracy in the optical apparatus.

It is desirable to satisfy the following condition:

$$WD > d \quad \text{formula (8-1)}$$

Because when the value of t is the same, the smaller the value of d, the larger the value of WD can be, according to the formula (1).

Depending on the product type, the value of WD satisfying the following condition is permissive:

$$WD > 0.1d \quad \text{formula (8-2)}$$

In this case, it is possible to reduce the size of the lenses 306, 322, 328, and the like by reducing the value of d.

It is desirable for the value of d to satisfy the following condition in order to increase the resolution:

$$d \geq 0 \quad \text{formula (8-2-1)}$$

Depending on the usage, it is sufficient to satisfy the following condition:

$$d < 0 \quad \text{formula (8-2-2)}$$

When the lower limit of $\underline{d}$ is set to 0.1 λ/A in the formula (8-2-1), the FF becomes close to the lens 306-1 side, making it easy to utilize the evanescent wave. At the same time, dust, scratch, or the like on the lens surface 310 becomes out of focus to thereby reduce adverse affect.

When the lower limit of $\underline{d}$ is set to 0.6 λ/A in the formula (8-2-1), the evanescent wave becomes easier to be utilized. Therefore, it is possible to easily increase the resolution as well as to reduce the adverse affect of dust, scratch, or the like.

When the lower limit of $\underline{d}$ is set to 1.3 λ/A in the formula (8-2-1), ease of use of the evanescent wave can be significantly improved. Therefore, it is possible to easily increase the resolution as well as to significantly reduce the adverse affect of dust, scratch, or the like.

Note that A is the numerical aperture of the optical system at the point FF in the optical system and is set to 1 in the optical system as shown in FIG. 7 in which the FF cannot be defined.

When the lower limit of $\underline{d}$ is set to 0.005 mm in the formula (8-2-1), it becomes easier to increase the distance between the negative index medium 301 and upper lens system, simplifying a frame structure for maintaining the distance between the negative index medium 301 and upper lens system.

When the upper limit of $\underline{d}$ is set to (−0.1 λ)/A in the formula (8-2-2), dust, scratch, or the like on the lens surface 310 becomes out of focus to thereby reduce adverse affect.

When the upper limit of $\underline{d}$ is set to (0.6 λ)/A in the formula (8-2-2), it is possible to further reduce the adverse affect of dust, scratch, or the like.

When the upper limit of $\underline{d}$ is set to (−1.3 λ)/A in the formula (8-2-2), it is possible to significantly reduce the adverse affect of dust, scratch, or the like.

Note that A is the numerical aperture (NA) of the image forming optical system 306, 322, 328, or the like at the point FF.

A description will be given of the influence of dust, scratch, or the like on the optical surface with respect to image forming capability. As described above with conditional formulas as to g and d, the larger the distance between the FF and optical surface situated immediately front or rear of the FF, the smaller the adverse affect of dust, scratch or the like on the optical surface becomes. The distance mentioned here is an optical length (equivalent air length).

It is desirable that the above distance be set to at least not less than 0.1 λ/A. It is further preferable that the distance be set to not less than 0.6 λ/A or 1.3 λ/A. The above optical surface includes the surface of the negative index medium.

Further, it is desirable that the value of WD can be changed. This is achieved by, for example, improving the mechanical structure of the optical apparatus. A stage of the microscope is a good example thereof.

The negative index medium 301 and the lens surface nearest to the negative index medium 301 (surface 311, in the case of FIG. 2) may be bonded to each other by an adhesive. Alternatively, the lens (306-1, in the case of FIG. 3) may be used as a substrate and the negative index medium 301 may be formed on the lens. In the above cases, the value of d is approximately 0, or 0.

Alternatively, the configuration is allowable in which the negative index medium 301 is formed on a transparent flat plate and the transparent flat plate is so disposed as to constitute a part of the lens to be used for image formation. It is preferable that the transparent flat plate be disposed at the foremost part (object side of the lens 306-1 in the case of FIG. 1) of the image forming lens system (objective lens 306, in the case of FIG. 1) or at the aftermost part thereof (wafer side of the 328, in the case of FIG. 5). It is preferable that the lens or transparent flat plate to be used as a substrate be made of a material having a positive refractive index. In this case, the lens or flat plate can be manufactured at low cost. The value of WD or d is measured from the surface of the negative index medium 301 even in the case where the negative index medium 301 is formed on the substrate.

Figure 11:
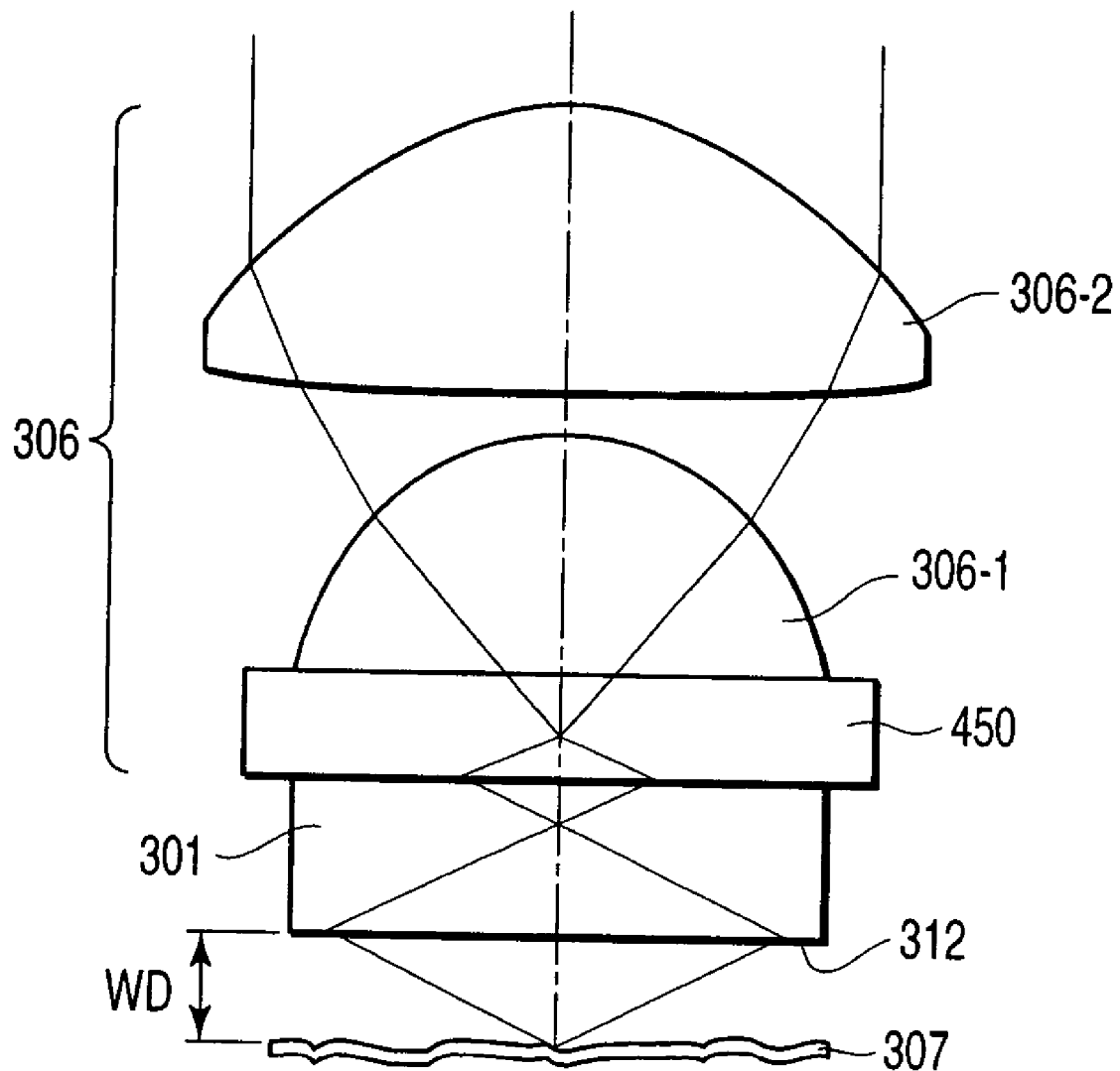
FIG. 11 is a view showing an example of a reflected-light microscope 302 using a plate-like negative index medium 301 formed on a flat plate 450 made of a material having a positive refractive index.

FIG. 11 shows an example of a reflected-light microscope 302 using a plate-like negative index medium 301 formed on a flat plate 450 made of a material having a positive refractive index.

The flat plate 450, lenses 306-1 and 306-2 are combined to form the objective lens 306. The intermediate image forming point FF slightly enters the flat plate 450. The lens 306-1 and flat plate 450 are bonded to each other. Alternatively, they may be attached tightly to each other. The formulas (12) and (13), described later, can be applied to the refractive index of the flat plate 450.

The optical system having the above configuration can be applied to the examples shown in FIGS. 3, 4, 5, and 7.

In terms of the deviation of the formula (1) which shows the condition of perfect image formation, assuming that $$WD + d - t = \Delta \quad \text{formula (8-3)}$$

is satisfied, the larger the value of $|\Delta|$, the worse the image forming state becomes.

When the following condition is satisfied, it is possible to stop degradation of image forming state at a certain level:

$$|\Delta| < \lambda \quad \text{formula (8-4)}$$

For practical use, it is sufficient for the value of $|\Delta|$ to satisfy the following condition depending on the product type:

$$|\Delta| < 10\lambda \quad \text{formula (8-4-1)}$$

It is sufficient for the value of $|\Delta|$ to satisfy the following condition depending on the use condition:

$$|\Delta| < 100\lambda \quad \text{formula (8-5)}$$

It may be preferable, in some cases, that the lower limit of the $|\Delta|$ in the formulas (8-4-1) to (8-5) be set to 0.1 $\lambda/A$ in order to obtain the merit of assuring the relatively long length of the WD.

Assuming that the refractive index of the negative index medium 301 is n, the condition n<0 is satisfied; whereas n=−1 is satisfied in the embodiment described above. When the negative index medium 301 is a plane parallel plate, it is ideally desirably that the condition n=−1 be satisfied. Actually, however, it may be impossible, in some cases, to satisfy n=−1 due to manufacturing error in the negative index medium 301 or difference in use wavelengths. In this case, it is desirable to satisfy the following formula:

$$-1.1 < n < -0.9 \quad \text{formula (9)}$$

When the value of n becomes out of the above range, condition of perfect image formation breaks and the resolution decreases. Depending on the product type, it is sufficient to satisfy the following condition:

$$-1.5 < n < -0.5 \quad \text{formula (10)}$$

Only for the purpose of widely setting the WD, it is sufficient for the value of n to satisfy the following condition in some case:

$$-3 < n < -0.2 \quad \text{formula (11)}$$

Assume that the refractive index of the lens or optical element nearest to the negative index medium (306-1, 322-1, and 328-1, in the cases of FIGS. 1, 4, and 5, respectively) is N. In this case, the larger the value of N, the higher the resolution becomes.

When the following condition is satisfied, the application of the optical apparatus is expanded:

$$N \geq 1.3 \quad \text{formula (12)}$$

It is further preferable to satisfy the following condition:

$$N \geq 1.7 \quad \text{formula (13)}$$

It is preferable that the upper limit of N be set to 1.82 in the formulas (12) and (13). In this case, the absorption (coloration) of the glass can be reduced.

When the following condition is satisfied, it is possible to achieve high resolution although the coloration is observed:

$$N \geq 1.86 \quad \text{formula (13-1)}$$

Note that the negative index medium 301 is assumed to be surrounded by air or vacuum in all the embodiments of the present invention.

Therefore, the refractive index n of the negative index medium 301 represents the relative refractive index with respect to air in the case where the negative index medium 301 is surrounded by air, and represents the relative refractive index with respect to vacuum in the case where the negative index medium 301 is surrounded by vacuum. In the case where the negative index medium 301 is surrounded by vacuum, short-wavelength vacuum ultra violet radiation can be used. Further, decrease in the resolution due to air fluctuation does not occur. As a result, satisfactory image forming capability can be obtained. In the case where the negative index medium 301 is surrounded by air, the optical apparatus can be easily manufactured and handled.

The configuration is allowable in which only the optical path in the area around the negative index medium 301 is enclosed in vacuum and the residual parts of the optical apparatus are surrounded by air.

Thus, it is possible to obtain an optical apparatus excellent in ease of use and image forming capability.

Assuming that the refractive index of the negative index medium 301 with respect to vacuum is nv and the refractive index of air with respect to vacuum is nA, nA=1.0002818, where the air pressure is 1 atm and wavelength is 500 nm.

The required condition for obtaining ideal perfect image formation in the case where the optical apparatus is surrounded by air is as follows:

$$nv = -nA \quad \text{formula (15)}$$

The required condition for obtaining ideal perfect image formation in the case where the optical apparatus is surrounded by vacuum is as follows:

$$nv = -1.0 \quad \text{formula (16)}$$

The portion corresponding to d or WD may be immersed in liquid such as water or oil in the examples shown in FIGS. 1, 2, 3, 4, 5, 7, 8, and 11. In this configuration, the value of nv need not be −1, widening the choice of materials of negative index medium 301. In this case, assuming that the refractive index of the liquid such as water or oil is nL, the required condition for obtaining perfect image formation is as follows:

$$nV = -nL \quad \text{formula (15-3)}$$

Assuming that the relative refractive index of the negative index medium 301 with respect to the liquid is n, the formulas (9), (10), and (11) are applicable.

A description will next be given of the value of t. It is preferable to increase the vale of WD in order to achieve the ease of use of the optical apparatus from a practical standpoint.

It can be seen from the formula (1) that the WD assumes a value nearly equal to $\underline{t}$. Therefore, it is preferable to satisfy the following condition:

$$0.1 \text{ mm} \leq t \leq 300 \text{ mm} \quad \text{formula (17)}$$

When the value of t exceeds the upper limit in the formula (17), the size of the optical apparatus is increased to make it difficult to manufacture the optical apparatus.

It is sufficient to satisfy the following condition, depending on the product type:

$$0.01 \text{ mm} \leq t \leq 300 \text{ mm} \quad \text{formula (18)}$$

Depending on the use, it may be sufficient, in some cases, to satisfy the following condition:

$$1100 \text{ nm} \leq t \leq 200 \text{ mm} \quad \text{formula (19), or}$$

$$100 \text{ nm} \leq t \leq 50 \text{ mm} \quad \text{formula (20)}$$

When the formula (17) or formula (18) is satisfied, the mechanical strength of the negative index medium as an optical element is increased to make it easier to handle the optical apparatus at the assembly time, or it may be possible to eliminate the substrate that supports the negative index medium.

When the upper limit of $\underline{t}$ is set to 0.01 mm in the formulas (19) and (20), it may be possible to manufacture the negative index material as a thin film by vacuum evaporation, sputtering or the like.

For example, it can be considered that the photonic crystal is manufactured by self-cloning (see non-patent document 6).

It is preferable that the length of the optical system including the negative index medium to be measured along the optical axis be set to not more than 20 m. In this case, it becomes easier to manufacture the optical system and optical apparatus.

As shown in the embodiments shown in FIGS. 1, 3, 4, and 5, the distance between the image forming optical system (306, 322, 328 or the like) and object point (FF, 321, 325 or the like) or image point (real image on the front of 308, FF, image on 324, or the like) is finite.

The term "perfect image formation" used in the present specification includes the case where 100 percent perfect image formation is not achieved, for example, the case where the resolution is increased by 50 percent. That is, perfect image formation in the present specification includes also the case where, for example, the resolution is increased to some extent relative to normal diffraction limit.

According to the present invention, it is possible to realize an optical apparatus having various optical systems with satisfactory optical capability, the optical systems having a long length of WD or being configured to be non-contact type.

Finally, definitions of the technical terms used in the embodiments will be described.

The optical apparatus denotes an apparatus including an optical system or optical element. The optical apparatus need not function as a single unit. That is, the optical apparatus may be a part of an apparatus.

The optical apparatus includes an image pickup apparatus, an observation apparatus, a display apparatus, an illumination apparatus, a signal processing apparatus, an optical information processing apparatus, a projection apparatus, a projection exposure apparatus, and the like.

Examples of the image pick-up apparatus include a film camera, digital camera, PDA digital camera, robot's eye, single-lens reflex digital camera with interchangeable lenses, TV camera, video recording apparatus, electronic video recording apparatus, camcorder, VTR camera, mobile phone digital camera, mobile phone TV camera, electronic endoscope, capsule endoscope, car-mounted camera, satellite-mounted camera, camera mounted on planetary probe, camera mounted on space probe, camera in monitoring system, eye of various sensors, digital camera mounted on recording apparatus, machine vision, laser scanning type microscope, projection exposure apparatus, stepper, aligner, optical probe microscope, and the like. The digital camera, card type digital camera, TV camera, VTR camera, video recording camera, mobile phone digital camera, mobile phone TV camera, car-mounted camera, satellite-mounted camera, camera mounted on planetary probe, camera mounted on space probe, digital camera mounted on recording apparatus are all examples of the electronic image pick-up apparatus.

Examples of the observation apparatus include a microscope, telescope, eyeglasses, binocular telescope, loupe, fiber scope, finder, view finder, contact lens, intraocular lens, machine vision, and the like.

Examples of the display apparatus include a liquid crystal display, view finder, game console, video projector, liquid crystal projector, head mounted display (HMD), personal digital assistants (PDA), mobile phone, machine vision, and the like.

The video projector, liquid crystal projector, and the like are included in the group of projection apparatus.

Examples of the illumination apparatus include a flash light of a camera, car headlight, endoscope light source, microscope light source and the like.

Examples of the signal processing apparatus include a mobile phone, personal computer, game console, optical disk reading and writing apparatus, computation apparatus of optical calculator, optical interconnection apparatus, optical information processing apparatus, optical LSI, optical computer, PDA, and the like.

An information transmission apparatus denotes an apparatus that can input and transmit some sort of information. Examples of the information transmission apparatus include a mobile phone, fixed telephone, game console, television remote controller, radio cassette player remote controller, stereo remote controller, personal computer, personal computer keyboard, personal computer mouse, personal computer touch panel, and the like.

A TV monitor, PC monitor, display with image pick-up apparatus are also included in the information transmission apparatus.

The information transmission apparatus is included in the group of signal processing apparatus.

Examples of the image pick-up apparatus include a CCD, image pick-up tube, solid-state image pick-up element, photographic film. The plane parallel plate is included in one of prisms. A change of an observer includes a change in diopter. A change of an object includes a change in object distance, the displacement of the object, the movement of the object, vibration, or the shake of the object. The image pick-up element, wafer, optical disk, silver halide film and the like are examples of an image forming member.

An extended curved surface is defined as follows: Any shape such as a spherical, planar, or rotationally symmetrical aspherical surface; a spherical, planar, or rotationally symmetrical aspherical surface which is decentered with respect to the optical axis; an aspherical surface with plane of symmetry; an aspherical surface with only one plane of symmetry; an aspherical surface with no plane of symmetry; a free-formed surface; a surface with a nondifferentiable point or line; etc. is satisfactory. Moreover, any surface which has some effect on light, such as a reflecting or refracting surface, is satisfactory.

In the present invention, it is assumed that such a surface is generally referred to as the extended curved surface.

The image forming optical system denotes an image pick-up optical system, observation optical system, projection n optical system, projection exposure optical system, display optical system, optical system for signal processing, and the like.

An example of the image pick-up optical system includes an image pick-up lens of the digital camera.

Examples of the observation optical system include a microscope optical system, telescope optical system, and the like.

Examples of the projection optical system include an optical system of a video projector, optical system for lithography, optical system for reading and writing a signal from/to an optical disk, optical system of an optical pick-up, and the like.

An example of the projection exposure optical system includes an optical system for lithography.

An example of the display optical system includes an optical system of an viewfinder provided in a video camera.

Examples of the optical system for signal processing include an optical system for reading and writing signal from/onto optical disk, optical system of an optical pick-up, and the like.

The optical element denotes lens, aspherical lens, mirror, prism, free-form surface-prism, diffractive optical element (DOE), inhomogeneous lens and the like. The plane parallel plate is included in one of the optical elements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical element including a transparent flat plate, and a medium exhibiting negative refraction formed on the flat plate serving as a substrate, wherein the transparent flat plate is made of a material exhibiting a positive refractive index.

2. An optical system having an optical element made of a medium exhibiting negative refraction wherein image formation is performed with high precision.

3. An optical system having an optical element made of a medium exhibiting negative refraction wherein image formation with high precision is performed using perfect image formation properties.

4. An optical system having an optical element made of a medium exhibiting negative refraction wherein a long working distance is obtained.

5. An optical system having an optical element made of a medium exhibiting negative refraction, and an optical element made of a medium exhibiting a positive refractive index, wherein there existed a gap between the optical element made of a medium exhibiting a positive refractive index, which is nearest to the optical element made of a medium exhibiting a negative refraction, and the optical element made of a medium exhibiting a negative refraction.

6. An optical system constituted by a combination of an optical element made of a medium exhibiting negative refraction and an image forming optical system, wherein a distance between an object point or an image point to the image forming optical system and the image forming optical system is a finite distance.

7. An optical system including an image formation relationship achieved by an optical element made of a medium exhibiting negative refraction, and an image formation relationship achieved by an image forming optical system, wherein the image formed by an optical element made of a medium exhibiting negative refraction is a virtual image.

8. An optical system including an optical system including an optical element made by a medium exhibiting negative refraction, and an image forming optical system, wherein the optical system is used for forming an image and the image forming optical system is used for re-forming the image.

9. An optical system including an optical system including an optical element made by a medium exhibiting negative refraction, and an image forming optical system, wherein the image forming optical system is used for forming an image and the optical system is used for re-forming the image.

10. An optical system having an optical element made of a medium exhibiting negative refraction, wherein an object to be imaged by the optical system has a two- or three-dimensional shape.

11. An optical system having an optical element made of a medium exhibiting negative refraction, wherein light passes through the medium exhibiting negative refraction two times.

12. An optical system constituted by a combination of an optical element made of a medium exhibiting negative refraction and an image forming optical system, wherein the following formula (0-1-0) or formula (0-5) is satisfied, $$0 < g < 1000\lambda \quad \text{formula (0-1-0)}$$

$$g < 0 \quad \text{formula (0-5)}$$

where g is a distance between an image point of the optical element made of a medium exhibiting negative refraction and an incident surface of the image forming optical system.

13. An optical system constituted by a combination of an optical element made of a medium exhibiting negative refraction and an image forming optical system, wherein the following formula (4) is satisfied, $$0.15(WD+d) < t < 4.0(WD+d) \quad \text{formula (4)}$$

where WD is the distance between the medium exhibiting negative refraction and an object or an image surface, d is the distance between the medium exhibiting negative refraction and an intermediate image forming point of an optical system, and t is the thickness of the medium exhibiting negative refraction.

14. An optical system having an optical element made of a medium exhibiting negative refraction, wherein the refractive index of the medium exhibiting negative refraction satisfies the following formula (11):

$$-3 < n < -0.2 \quad \text{formula (11)}.$$

15. An optical system having an optical element made of a medium exhibiting negative refraction, and an optical element other than the optical element made of a medium exhibiting negative refraction, wherein the refractive index of the medium exhibiting negative refraction satisfies the following formula (11):

$$-3 < n < -0.2 \quad \text{formula (11)}.$$

16. An optical system constituted by a combination of an optical element made of a medium exhibiting negative refraction and an image forming optical system, wherein the refractive index of the medium exhibiting negative refraction satisfies the following formula (11):

$$-3 < n < -0.2 \quad \text{formula (11)}.$$

17. An optical system having an optical element made of a medium exhibiting negative refraction, wherein an NA (Numerical Aperture) of the optical system on the object side, the image side, or at an intermediate image forming point exceeds 0.2.

18. An optical system having an optical element made of a medium exhibiting negative refraction, and an optical element other than the optical element made of a medium exhibiting negative refraction, wherein an NA (Numerical Aperture) of the optical system on the object side, the image side, or at an intermediate image forming point exceeds 0.2.

19. An optical system constituted by a combination of an optical element made of a medium exhibiting negative refraction and an image forming optical system, wherein an NA (Numerical Aperture) of the optical system on the object side, the image side, or at an intermediate image forming point exceeds 0.2.

20. An optical system having an optical element made of a medium exhibiting negative refraction, wherein the following formula (8) is satisfied, $$20 \text{ nm} < WD < 200 \text{ mm} \quad \text{formula (8)}$$

where WD is the distance between the medium exhibiting negative refraction and an object or an image surface.

21. An optical system constituted by a combination of an optical element made of a medium exhibiting negative refraction and an image forming optical system, wherein the following formula (8-2) is satisfied, $$WD < 0.1d \quad \text{formula (8-2)}$$

where WD is the distance between the medium exhibiting negative refraction and an object or an image surface, and d is the distance between the medium exhibiting negative refraction and an intermediate image forming point of an optical system.

22. An optical system constituted by a combination of an optical element made of a medium exhibiting negative refraction and an image forming optical system, wherein the following formula (8-5) is satisfied, $$|\Delta| < 100\lambda \quad \text{formula (8-5)}$$

where $\Delta = WD + d - t$ and

WD is the distance between the medium exhibiting negative refraction and an object or an image surface, d is the distance between the medium exhibiting negative refraction and an intermediate image forming point of an optical system, and t is the thickness of the medium exhibiting negative refraction.

23. An optical system, wherein an image forming optical system is disposed at the rear of an optical element made of a medium exhibiting negative refraction.

24. An optical apparatus having the optical system according to claim 23.

25. An optical system, wherein an image forming optical system is disposed at the front of an optical element made of a medium exhibiting negative refraction.

26. An optical apparatus having the optical system according to claim 25.

27. An optical system constituted by a combination of an optical element made of a medium exhibiting negative refraction and an image forming optical system, wherein the following formula (12) is satisfied, $$N < 1.3 \quad \text{formula (12)}$$

where N is the refractive index of an optical element which is located closest to an optical element made of a medium exhibiting negative refraction.

28. An optical system having a lens, wherein the lens includes an optical element made of a material exhibiting a positive refractive index, and a medium exhibiting negative refraction formed on the optical element serving as a substrate, wherein the optical system includes an image forming optical system, and the substrate constitutes a part of the image forming optical system.

29. An optical system having an optical element, wherein the optical element includes an optical element made of a material exhibiting a positive refractive index, and a medium exhibiting negative refraction formed on the optical element serving as a substrate, wherein the optical system includes an image forming optical system, and the substrate constitutes a part of the image forming optical system.

30. An optical system having a lens, wherein the lens includes an optical element made of a material exhibiting a positive refractive index, and a medium exhibiting negative refraction formed on the optical element serving as a substrate, wherein the optical element includes an image forming optical system, and the substrate is bonded to an optical element constituting the image forming optical system.

31. An optical system having an optical element, wherein the optical element includes an optical element made of a material exhibiting a positive refractive index, and a medium exhibiting negative refraction formed on the optical element serving as a substrate, wherein the optical element includes an image forming optical system, and the substrate is bonded to an optical element constituting the image forming optical system.

32. An optical apparatus having a light source, a member with a microscopic structure, and an optical element made of a medium exhibiting negative refraction and performing image formation of the microscopic structure.

33. An optical system according to claim 32, wherein the following formula (8) is satisfied, $$20 \text{ nm} < WD < 200 \text{ mm} \quad \text{formula (8)}$$

where WD is the distance between the medium exhibiting negative refraction and an object or an image surface.

34. An optical apparatus according to claim 32, wherein a photonic crystal is used as the medium exhibiting negative refraction.

35. An optical apparatus according to claim 34, wherein the medium exhibiting negative refraction is a negative refractive index medium.

36. An exposure apparatus having a light source, a photomask, and an optical element made of a medium exhibiting negative refraction, which are disposed in sequence, and performing an exposure process with respect to a wafer.

37. An optical apparatus according to any one of claims 32 and 36, wherein the medium exhibiting negative refraction is a negative refractive index medium.

38. The apparatus according to any one of claims 32 and 36, wherein the medium exhibiting negative refraction has perfect image formation properties.

39. An optical apparatus having a light source, a member with a microscopic structure, and an optical element made of a medium exhibiting negative refraction and performing image formation of the microscopic structure, wherein the optical element made of a medium exhibiting negative refraction is a plane parallel plate.

40. An optical apparatus having a light source, a member with a microscopic structure, and an optical element made of a medium exhibiting negative refraction and performing image formation of the microscopic structure, wherein the refractive index n of the medium exhibiting negative refraction satisfies the following formula (11):

$$-3 < n < -0.2 \qquad \text{formula (11)}.$$

41. An optical system having a light source, a member with a microscopic structure, and an optical element made of a medium exhibiting negative refraction and performing image formation of the microscopic structure, wherein the following formula (8-2) is satisfied, $$WD < 0.1d \qquad \text{formula (8-2)}$$

where WD is the distance between the medium exhibiting negative refraction and an object or an image surface, and d is the distance between the medium exhibiting negative refraction and an intermediate image forming point of an optical system.

42. An optical apparatus having a light source, a member with a microscopic structure, and an optical element made of a medium exhibiting negative refraction, and the optical element made of a medium exhibiting negative refraction includes an optical element made of a material exhibiting a positive refractive index, and a medium exhibiting negative refraction formed on the optical element serving as a substrate.

43. A lens having a curved optical surface comprising a medium exhibiting negative refraction, wherein a photonic crystal is used as the medium exhibiting negative refraction.

44. An optical apparatus having a light source, a member with a microscopic structure, and an optical element made of a medium exhibiting negative refraction and performing image formation of the microscopic structure, wherein a monochromatic light is used.

45. An optical system having an optical element made of a medium exhibiting negative refraction, wherein the wavelength of the light used falls within a range of 0.1 to 3 μm.

46. An optical apparatus having a light source, a member with a microscopic structure, and an optical element made of a medium exhibiting negative refraction and performing image formation of the microscopic structure, wherein the wavelength of the light used falls within a range of 0.1 to 3 μm.

47. An optical system having an optical element made of a medium exhibiting negative refraction, wherein an evanescent wave is used for image formation.

48. An optical apparatus according to claim 47, wherein the medium exhibiting negative refraction is a negative refractive index medium.

49. An optical system according to claim 47, wherein the medium exhibiting negative refraction has perfect image formation properties.

50. An optical apparatus having a light source, a member with a microscopic structure, and an optical element made of a medium exhibiting negative refraction and performing image formation of the microscopic structure, wherein an evanescent wave is used for image formation.

51. An optical apparatus according to claim 50, wherein the medium exhibiting negative refraction is a negative refractive index medium.

52. An optical system according to claim 50, wherein the medium exhibiting negative refraction has perfect image formation properties.

53. An optical apparatus having an optical system including an optical element made of a medium exhibiting negative refraction, wherein the distance between the medium exhibiting negative refraction and an object, an image forming member, or a member with a microscopic structure is variable.

54. An optical apparatus having a light source, a member with a microscopic structure, and an optical element made of a medium exhibiting negative refraction and performing image formation of the microscopic structure, wherein the distance between the medium exhibiting negative refraction and an object, an image forming member, or a member with a microscopic structure is variable.

55. An optical apparatus having an optical element made of a medium exhibiting negative refraction, wherein the medium exhibiting negative refraction is entirely or partly immersed in liquid.

56. An optical apparatus having a light source, a member with a microscopic structure, and an optical element made of a medium exhibiting negative refraction and performing image formation of the microscopic structure, wherein the medium exhibiting negative refraction is entirely or partly immersed in liquid.

57. A lens including an optical element made of a material exhibiting a positive refractive index, and a medium exhibiting negative refraction formed on the optical element serving as a substrate, wherein the thickness t of the medium exhibiting negative refractive satisfies any one of the following formulas (17) to (20):

| | |
|---|---|
| 0.1 mm < t < 300 mm | formula (17) |
| 0.01 mm < t < 300 mm | formula (18) |
| 1100 nm < t < 200 mm | formula (19) |
| 100 nm < t < 50 mm | formula (20). |

58. An optical element including an optical element made of a material exhibiting a positive refractive index, and a medium exhibiting negative refraction formed on the optical element serving as a substrate, wherein the thickness t of the medium exhibiting negative refraction satisfies any one of the following formulas (17) to (20):

| | |
|---|---|
| 0.1 mm < t < 300 mm | formula (17) |
| 0.01 mm < t < 300 mm | formula (18) |
| 1100 nm < t < 200 mm | formula (19) |
| 100 nm < t < 50 mm | formula (20). |

59. An optical apparatus provided with an optical system having an optical element made of a medium exhibiting negative refraction and an image forming optical system, wherein the absolute value of the distance between an intermediate image forming point of the image forming optical system and the surface of the optical element made of a medium exhibiting negative refraction is 0.1 λ/NA or more, where NA is a numerical aperture of the image forming optical system at the intermediate image forming point.

60. An optical apparatus provided with an optical system having an optical element made of a medium exhibiting negative refraction and an image forming optical system, wherein the absolute value of the distance between the optical surface of the image forming optical system nearest to the optical element made of a medium exhibiting negative refraction and an intermediate image forming point of the image forming optical system is 0.1 λ/NA or more, where NA is a numerical aperture of the image forming optical system at the intermediate image forming point.

61. An optical apparatus having a light source, a member with a microscopic structure, and an optical element made of a medium exhibiting negative refraction, wherein the distance between the member with a microscopic structure and the surface of the optical element made of a medium exhibiting negative refraction is 0.1 λ or more.

62. An optical apparatus having an optical element made of a medium exhibiting negative refraction and an image forming optical system, wherein the thickness t of the optical element made of a medium exhibiting negative refraction satisfies any one of the following formulas (17) to (20):

$$0.1\ \mathrm{mm} < t < 300\ \mathrm{mm} \qquad \text{formula (17)}$$

$$0.01\ \mathrm{mm} < t < 300\ \mathrm{mm} \qquad \text{formula (18)}$$

$$1100\ \mathrm{nm} < t < 200\ \mathrm{mm} \qquad \text{formula (19)}$$

$$100\ \mathrm{nm} < t < 50\ \mathrm{mm} \qquad \text{formula (20)}.$$

63. An optical apparatus having a light source, a member with a microscopic structure, and an optical element made of a medium exhibiting negative refraction, wherein the thickness t of the optical element made of a medium exhibiting negative refraction satisfies any one of the following formulas (17) to (20):

$$0.1\ \mathrm{mm} < t < 300\ \mathrm{mm} \qquad \text{formula (17)}$$

$$0.01\ \mathrm{mm} < t < 300\ \mathrm{mm} \qquad \text{formula (18)}$$

$$1100\ \mathrm{nm} < t < 200\ \mathrm{mm} \qquad \text{formula (19)}$$

$$100\ \mathrm{nm} < t < 50\ \mathrm{mm} \qquad \text{formula (20)}.$$

64. An optical apparatus provided with an optical system having an optical element made of a medium exhibiting negative refraction, wherein a photonic crystal is used as the medium exhibiting negative refraction and the axis whose direction exhibits best rotationally symmetrical characteristics of the photonic crystal extends in parallel to the optical axis of the optical system.

65. An optical apparatus provided with an optical element made of a medium exhibiting negative refraction, wherein the length of the optical system measured along the optical axis thereof is 20 m or less.

66. An optical system having an optical element made of a medium exhibiting negative refraction, wherein the medium exhibiting negative refraction has perfect image formation properties.

67. A lens made of a negative index photonic crystal as a medium exhibiting negative refraction, and having a curved optical surface.

\* \* \* \* \*